(12) United States Patent
Little et al.

(10) Patent No.: US 6,981,150 B2
(45) Date of Patent: Dec. 27, 2005

(54) APPARATUS AND METHOD FOR AUTHORIZING TRANSFER OF SOFTWARE INTO ONE OR MORE EMBEDDED SYSTEMS

(75) Inventors: Lincoln M. Little, Columbus, IN (US); Mark P. McNulty, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 805 days.

(21) Appl. No.: 09/754,572

(22) Filed: Jan. 4, 2001

(65) Prior Publication Data

US 2002/0087891 A1 Jul. 4, 2002

(51) Int. Cl.$^7$ ............... G06F 11/30; G06F 12/14; H04L 9/32; H04L 9/00; G01M 17/00
(52) U.S. Cl. ............... 713/191; 713/202; 705/56; 701/29; 701/114
(58) Field of Search ............... 701/114, 29; 709/221; 705/56; 713/202, 179, 191

(56) References Cited

U.S. PATENT DOCUMENTS

| | | | | |
|---|---|---|---|---|
| 5,278,759 A | | 1/1994 | Berra et al. ............... 364/424.01 |
| 5,398,285 A | * | 3/1995 | Borgelt et al. ............... 380/30 |
| 5,442,553 A | * | 8/1995 | Parrillo ............... 455/420 |
| 5,473,540 A | | 12/1995 | Schmitz ............... 364/424.05 |
| 5,759,102 A | * | 6/1998 | Pease et al. ............... 463/42 |
| 5,787,367 A | | 7/1998 | Berra ............... 701/1 |
| 5,802,485 A | | 9/1998 | Koelle et al. ............... 701/29 |
| 5,842,124 A | * | 11/1998 | Kenagy et al. ............... 455/418 |
| 5,844,987 A | | 12/1998 | Matthews et al. ............... 380/9 |
| 5,884,202 A | | 3/1999 | Arjomand ............... 701/29 |
| 5,890,086 A | | 3/1999 | Wellman et al. ............... 701/50 |
| 6,009,372 A | | 12/1999 | Baker et al. ............... 701/115 |
| 6,044,471 A | * | 3/2000 | Colvin ............... 713/202 |
| 6,173,402 B1 | * | 1/2001 | Chapman ............... 713/182 |
| 6,219,836 B1 | * | 4/2001 | Wells et al. ............... 717/178 |
| 6,263,497 B1 | * | 7/2001 | Maeda et al. ............... 717/170 |
| 6,487,646 B1 | * | 11/2002 | Adams et al. ............... 711/163 |
| 6,488,585 B1 | * | 12/2002 | Wells et al. ............... 463/43 |
| 6,560,651 B2 | * | 5/2003 | Katz et al. ............... 709/229 |
| 6,564,253 B1 | * | 5/2003 | Stebbings ............... 709/217 |

* cited by examiner

*Primary Examiner*—Gilberto Barrón, Jr.
*Assistant Examiner*—Michael J. Simitoski
(74) *Attorney, Agent, or Firm*—Barnes & Thornburg LLP

(57) ABSTRACT

An arrangement for authorizing transfer of software into one or more embedded systems includes a service/recalibration tool connectable to one or more embedded control units. A service technician or other operator of the tool obtains a hardware identification code corresponding to an identifier associated with an embedded control unit, or to an identifier associated with the tool, and also establishes a download number corresponding to the desired number of downloads when the identifier is associated with the tool, and a software identification code corresponding to an identifier of software to be transferred from the tool to the embedded control unit, and provides this information to a provider of the software who creates one or more passwords based thereon. The service technician may then use the one or more passwords to transfer one or more password-protected portions of the software from the tool into the one or more embedded control units.

12 Claims, 3 Drawing Sheets

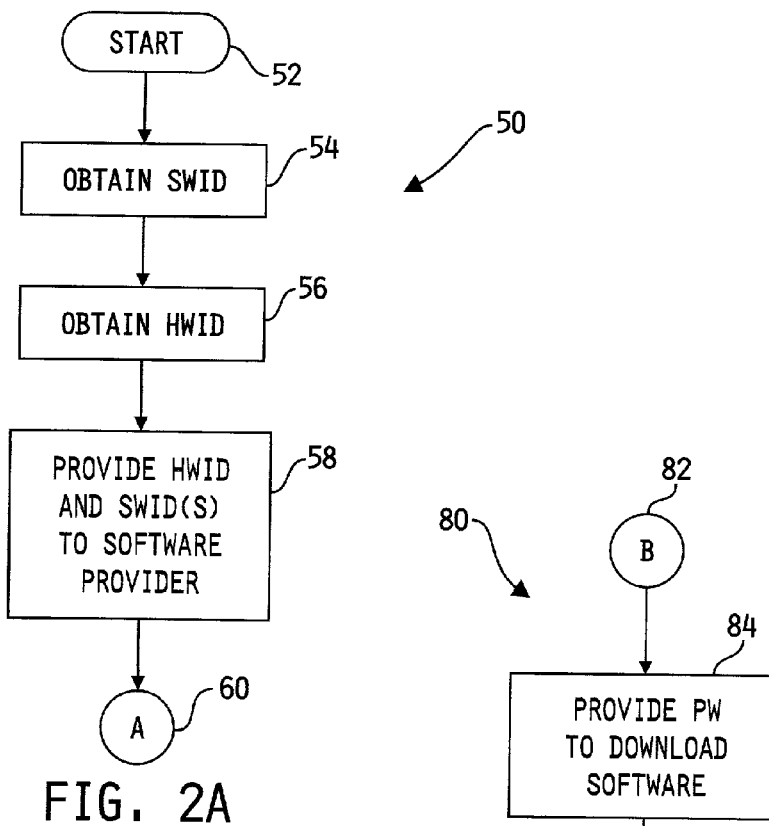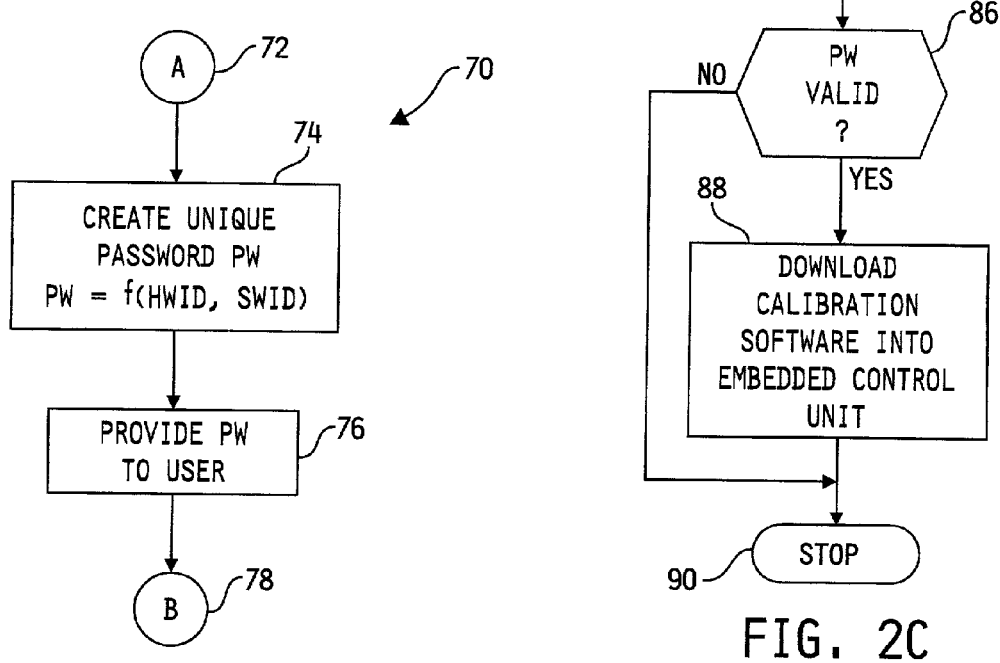
FIG. 2A
FIG. 2B
FIG. 2C

APPARATUS AND METHOD FOR AUTHORIZING TRANSFER OF SOFTWARE INTO ONE OR MORE EMBEDDED SYSTEMS

FIELD OF THE INVENTION

The present invention relates generally to techniques for loading software programs and/or data into embedded systems, and more specifically to techniques for authorizing the transfer of such software programs and/or data into one or more embedded systems.

BACKGROUND OF THE INVENTION

Systems for accessing embedded electronic control systems are known and have been widely implemented in the automotive and heavy duty vehicle industries. For example, numerous software and data exchange systems have been devised wherein a computer controlled service or recalibration tool is configured to communicate with a vehicle control computer located on-board a motor vehicle for transferring executable software algorithms, engine/vehicle calibration information and/or other data thereto, and for downloading diagnostic and/or other data therefrom. Communication between the service/recalibration tool and the embedded computer system may typically be conducted over a wired communication path, such as a parallel or serial data link in accordance with a desired communications protocol, or via a wireless communication system such as, for example, a radio, cellular, internet or intranet link.

In electronic data transfer systems of the foregoing type, software information is typically transferred from the service/recalibration tool to the embedded computer system by first obtaining the new software in the form of a predefined set of instructions, calibration information or the like, loading the new software into the service/recalibration tool and then transferring the software to the embedded system over a preestablished communication link in accordance with a predefined set of software loading instructions.

In the case where the software information to be loaded into the embedded system takes the form of new or updated calibration information, the software provider (i.e., engine manufacturer) typically provides the calibration information in the form of one or more feature sets. Each feature set often includes a number of features subsets each differing in feature complexity, feature flexibility and/or overall feature attributes. For example, one feature set may be a "cruise control" feature wherein available feature subsets may include a basic or minimal function cruise control option, a basic cruise control with engine brake disable option, an adaptive cruse control option, and/or the like.

Oftentimes, as the software provider develops new features and/or new feature subsets, these new features and/or features subsets are simply incorporated into the calibration information and made available to the end user at no charge. This approach is generally unprofitable and may even become costly to the software provider who may have expended considerable time, effort and/or expense in developing the new features and/or feature subsets. Ideally, software providers should have the option of charging their customers fair value for at least some of the newly developed features and/or feature subsets. In doing so, software providers will likely desire the ability to control which one or more of the features and/or feature subsets will be made available free of charge and which will carry a cost.

What is therefore needed is a system for controllably restricting access to at least some of the features or feature subsets within new or updated calibrations so that the software provider may at least have the option of deriving revenue from the development thereof. Such a system should ideally provide for the ability to selectively grant feature or feature subset download access based on satisfaction of at least one predefined criterion such as, for example, payment therefore.

SUMMARY OF THE INVENTION

The foregoing shortcomings of the prior art are addressed by the present invention. In accordance with one aspect of the present invention, a method of authorizing transfer of software into an embedded system comprises the steps of obtaining a hardware identification code relating to one of a service/recalibration tool and an embedded system, obtaining a software identification code relating to at least a portion of software information to be downloaded into the embedded system, creating a password as a function of the hardware identification code and the software identification code, and downloading a password protected portion of the software information from the service/recalibration tool into the embedded system based on the password.

In accordance with another aspect of the present invention, a method of authorizing transfer of software into an embedded system comprises the steps of providing a first identifier relating to software transferring hardware and a second identifier relating to software information to be downloaded into an embedded system to a provider of the software information, the software provider creating a password as a function of the first and second identifiers, and downloading a password protected portion of the software information into the embedded system based on the password.

One object of the present invention is to provide an apparatus and method for authorizing transfer of software into one or more embedded systems.

Another object of the present invention is to provide a system for creating a revenue stream through the use of such an apparatus and method by allowing a software provider to selectively charge for one or more features or feature subsets forming at least a part of the software to be transferred.

These and other objects of the present invention will become more apparent from the following description of the preferred embodiments.

BRIEF DESCRIPTION OF THE DRAWINGS

FIG. 2 consists of FIGS. 2A–2C and is a flowchart illustrating one preferred embodiment of a process for carrying out the concepts of the present invention.

DESCRIPTION OF THE PREFERRED EMBODIMENTS

Figure 1:
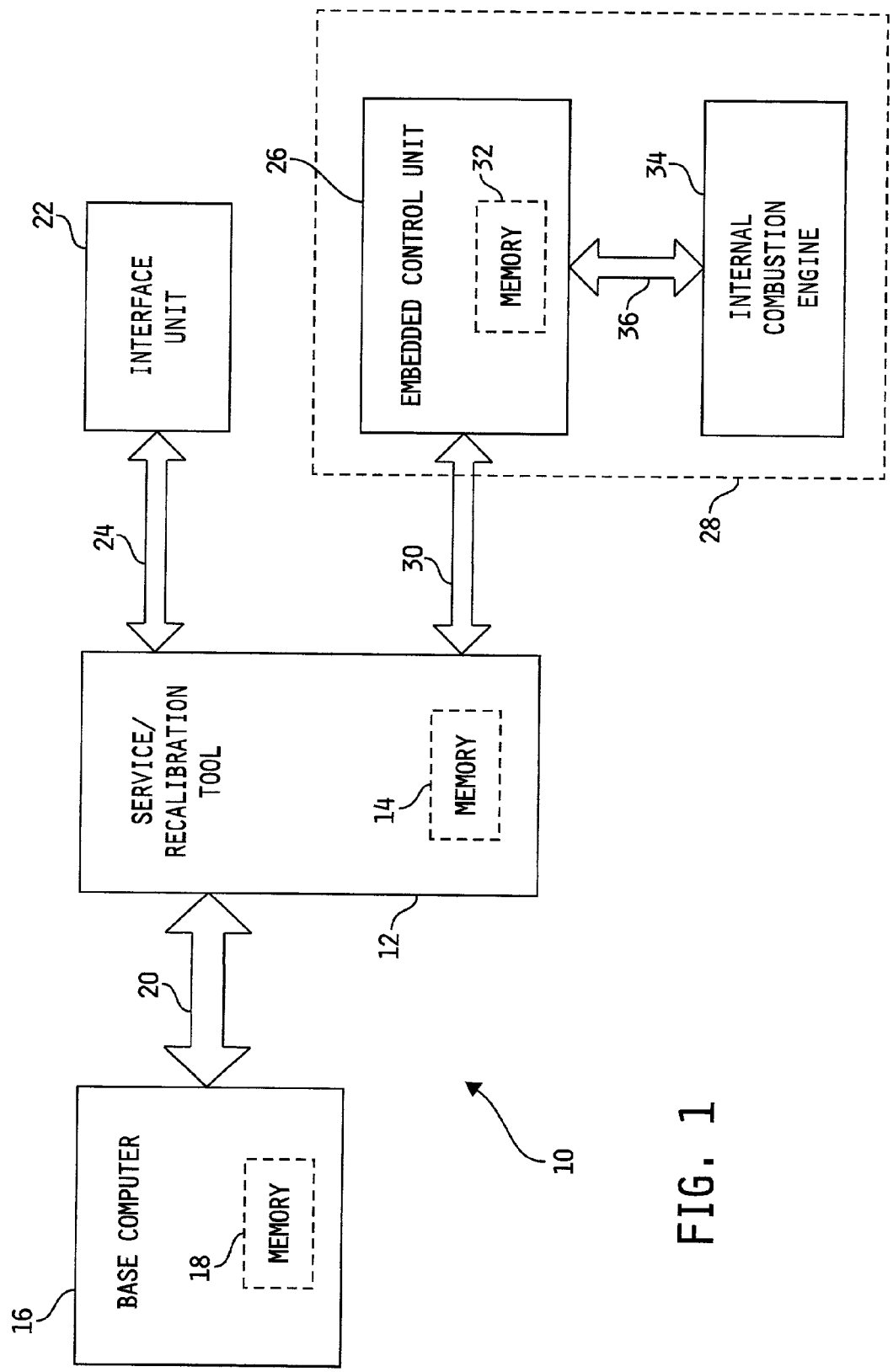
FIG. 1 is a diagrammatic illustration of one preferred embodiment of a system for authorizing transfer of software into one or more embedded systems, in accordance with the present invention.

For the purposes of promoting an understanding of the principles of the invention, reference will now be made to preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Referring now to FIG. 1, one preferred embodiment of a system 10 for authorizing transfer of software into one or more embedded systems, in accordance with the present invention, is shown. As used herein, the term "embedded system" is defined as any computer controlled system forming part of a larger structure or arrangement, wherein access to a memory portion of the computer controlled system is not readily available through standard connectable communication interfaces such as disk drives, telephone modems, and the like. Rather, communication with the memory portion of an embedded system, as this term is used herein, requires a hardwire connection to a communications port of the embedded system in the case of wired communications, or in the case of wireless communications, the embedded system is required to include as a part of the embedded system a suitable communications device such as a telephone modem, RF transceiver, satellite transceiver, or other wireless transceiver capable of communicating with the outside world.

Central to 10 is a service/recalibration tool 12 including a memory unit 14. Tool 12 is computer controlled, and preferably includes a microprocessor operable to control and manage the overall operation of tool 12. Tool 12 is connected, or connectable to, a base computer 16 having a memory unit 18 via a communication path designated generally at 20. Base computer 16 may be any known computer system operable to communicate with tool 12 and may therefore be a mainframe, server, network, personal (PC) computer, or the like. The communication path 20 may comprise any known hardwired or wireless communication path, and communications between computer 16 and tool 12 may be conducted in accordance with any known communications protocol. Examples of such a communication path 20 that may be established between tool 12 and computer 16 include, but are not limited to, a hardwired connection, telephone modem connection (including cellular telephone), radio frequency (RF) link, infrared or microwave communications link, satellite link, internet (e.g., via the world-wide-web or WWW) or intranet (e.g., secure network) link, and the like. In this regard, the service/recalibration tool 12 and base computer 16 are each preferably equipped with appropriate communication ports and/or signal transceivers for conducting communications therebetween.

Service/recalibration tool 12 is further connectable to an interface unit 22 via a suitable communications path designated generally at 24. Interface unit 22 is preferably a known computer interface operable to supply tool 12 with electronic data. Examples of interface unit 22 include, but are not limited to, an external (i.e., external to tool 12) memory unit such as a magnetic disk memory unit or a digital compact disk memory unit operable to supply data to tool 12 in a known manner, a keypad or keyboard responsive to user actuation thereof to provide corresponding data to tool 12, or the like. As with communication path 20, communication path 24 may comprise any known hardwired or wireless communications path operable to conduct communications between tool 12 and interface unit 22 via one or more appropriate communication protocols, wherein examples of such a communication path are provided hereinabove.

Service/recalibration tool 12 is further connectable to an embedded control unit 26 via a suitable communications path designated generally at 30, wherein control unit 26 is embedded within a larger structure or arrangement 28. Control unit 26 is computer controlled and preferably includes a microprocessor operable to control and manage the overall operation of one or more controllable units carried by the larger structure or arrangement 28. The embedded control unit 26 may be any known computer system operable to communicate with tool 12 and which may be carried by any suitable structure or arrangement. As shown only by way of example in FIG. 1, the larger structure or arrangement 28 may be a motor vehicle and the control unit 26 embedded therein is connected via one or more suitable communication interfaces designated generally at 36 to an internal combustion engine 34. In one embodiment of this example, the embedded control unit 26 is operable to control and manage the overall operation of the internal combustion engine 34, and is typically referred to in this embodiment as an electronic or engine control module (ECM), electronic or engine control unit (ECU) or the like. Alternatively, the embedded control unit 26 may, in this example, be any known auxiliary control computer or other known computer-controlled module such as a powertrain control module, transmission control module, driver interface module, computer controlled entertainment system, or the like. As a specific example, the embedded control unit 26 may be a driver interface module of the type described in U.S. Pat. No. 5,303,163 to Ebaugh et al., which is assigned to the assignee of the present invention, and the disclosure of which is incorporated herein by reference. In any case, it is to be understood that the present invention contemplates that the embedded control unit 26 may be any known computer-controlled system carried by a larger structure or arrangement 28, wherein unit 26 is operable to control some type of controllable unit according to one or more software algorithms contained within memory unit 32.

As with the communication paths 20 and 24 described hereinabove, communication path 30 may comprise any known hardwired or wireless communication path, and communications between tool 12 and control unit 26 may be conducted in accordance with any known communications protocol. Examples of such a communication path 30 that may be established between tool 12 and control unit 26 include, but are not limited to, a hardwired connection such as a known SAE J1587 or J1939 serial data link, telephone modem connection (including cellular telephone), radio frequency (RF) link, infrared or microwave communications link, satellite link, internet (e.g., via the world-wide-web or WWW) or intranet (e.g., secure network) link, and the like. In this regard, the service/recalibration tool 12 and embedded control unit 26 are each preferably equipped with appropriate communication ports and/or signal transceivers for conducting communications therebetween.

The operation of system 10, in accordance with the present invention, will now be described as it applies to the transfer of software in the form of engine calibration information from the service/recalibration tool 12 into the embedded control unit 26. It is to be understood, however, that the concepts of the present invention are generally applicable to the transfer of any software, or portion thereof, from a computer-based tool 12 to a control unit 26 embedded within a larger structure or arrangement 28.

In the present example, conventional operation of system 10 typically requires a service technician to load new or updated engine calibration information supplied by a software provider into the memory unit 14 of the service/recalibration tool 12. This process may be carried out in accordance with any number of known techniques therefore such as via transfer of the software from the software provider's base computer 16 directly to the service/recalibration tool 12 over the communications path 20, or by loading the software resident on disk or other storage medium into the memory 14 of the tool 12 via the interface unit 22. In any event, the new or updated engine calibration information typically includes a set of rule-based software downloading instructions, or such instructions may already be resident within memory unit 14. In either case, such instructions are used by the service/recalibration tool 12 to guide proper transfer of the software into the memory unit 32 of the embedded control unit 26 according to predefined rules as is known in the art.

In accordance with the present invention, the software provider may restrict access to one or more of the features or feature subsets of the engine calibration software by requiring a password to download the one or more features or feature subsets within the engine calibration software using known techniques therefore. If the service technician desires access to the one or more restricted features or feature subsets, the technician is required to provide a hardware identification code, corresponding to at least an identifier associated with either the service/recalibration tool 12 or the embedded control unit 26, and a software identification code, corresponding to an identifier associated with at least one of the restricted features or feature subsets contained within the engine calibration software, along with the required fee therefore to the software provider. The software provider then creates a unique password based on at least the hardware identification code and the software identification code, and supplies this unique password to the service technician. The service technician may then use the unique password to transfer the one or more restricted features or feature subsets to the control unit 26.

Figure 3:
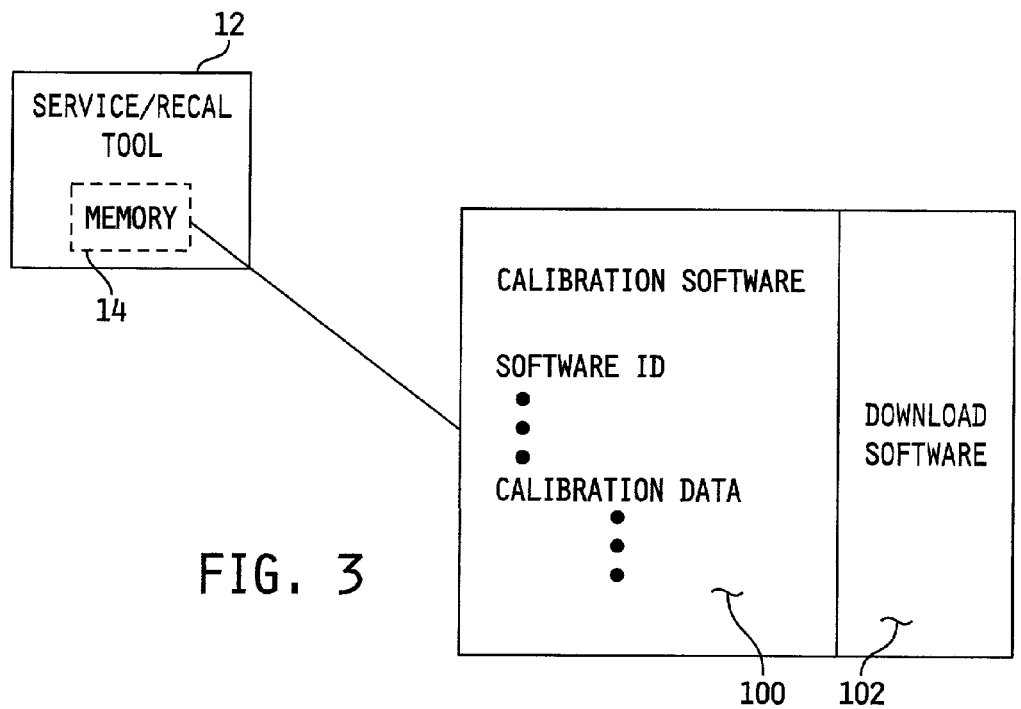
FIG. 3 is a diagrammatic illustration of example contents of the memory unit of the service/recalibration tool of FIG. 1 showing one preferred technique for obtaining a software identification code as required by step 54 of the flowchart of FIG. 2A.

Referring now to FIGS. 2A–2C, a flowchart is shown illustrating one preferred embodiment of a process for carrying out the present invention as described hereinabove. Referring specifically to FIG. 2A, a sub-process 50 is illustrated in flowchart form, wherein sub-process 50 is preferably carried out by a service technician, software user, or other personnel attempting to download software from service/recalibration tool 12 into one or more embedded control units 26. Sub-process 50 begins at step 52 and thereafter at step 54, the technician or other individual attempting to transfer software from the service/recalibration tool 12 into one or more embedded control units 26 obtains a software identification code (SWID). In one preferred embodiment, the SWID corresponds to an identifier associated with the new or updated engine calibration software package. This embodiment is illustrated in FIG. 3 with a portion of the contents of memory unit 14 shown as including the new or updated engine calibration software 100 previously loaded therein by the service technician via known techniques, as well as the download software 102 for controlling the transfer of the calibration software 100 into one or more of the embedded control units 26 in a manner known in the art. As shown in FIG. 3, the calibration software 100 resident within memory 14 typically includes a software ID along with calibration data and other information, and in this embodiment this software ID is preferably used as the SWID. Alternatively, any desired identification code or other identifier unique to the calibration software 100 may be stored within the software 100 and serve as the SWID for the purposes of the present invention. In any case, the service technician is preferably operable at step 54 of sub-process 50 to obtain the SWID by accessing the SWID from memory unit 14 of the service/recalibration tool 12 using known techniques.

In the embodiment of step 54 of sub-process 50 just described, the SWID obtained by the service technician corresponds to a unique identifier associated with the calibration software 100. In this case, the password that will be subsequently created by the software provider will allow access to all of the one or more password-protected features and/or feature subsets of the engine calibration software 100. In accordance with this embodiment of the present invention, the created password thus allows all of the one or more password-protected features and/or feature subsets forming part of the engine calibration software 100 to be transferred to one or more of the embedded control units 26.

In an alternate embodiment of step 54 of sub-process 50, the present invention provides for the ability to separately password-protect each of the one or more of the features and/or feature subsets forming the engine calibration software 100. In this embodiment, at least certain ones of the various features and/or feature subsets forming the engine calibration software 100 preferably have a unique software ID associated therewith. The service technician is then operable at step 54 to obtain a number of unique software identification codes each corresponding to a desired one of the password-protected features or feature subsets forming the engine calibration software. The software provider, in this embodiment, will accordingly provide a corresponding number of unique passwords each as a function of the HWID described below and also as a function of a unique one of the software IDs. Those skilled in the art will recognize that this embodiment allows the software provider to tailor a different fee for each password in accordance with the value of the corresponding feature or sub-feature. In accordance with this embodiment of the present invention, the various created passwords thus allow separately password-protected features and/or feature subsets forming part of the engine calibration software 100 to be transferred to one or more of the embedded control units 26 using correspondingly separate passwords.

Figure 4:
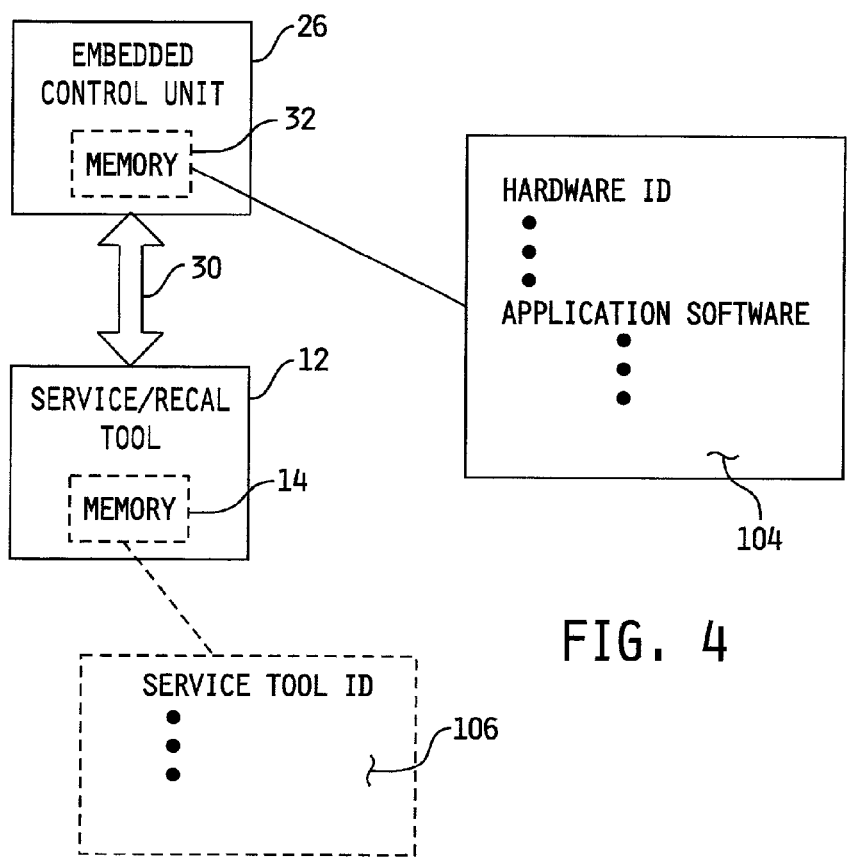
FIG. 4 is a diagrammatic illustration of example contents of the memory units of the embedded control unit and the service/recalibration tool showing alternate techniques for obtaining a hardware identification code as required by step 56 of the flowchart of FIG. 2A.

Following step 54, sub-process 50 advances to step 56 where the technician or other personnel attempting to transfer software from the service/recalibration tool 12 into the embedded control unit 26 obtains a hardware identification code (HWID). In one preferred embodiment, the HWID corresponds to an identifier associated with the embedded control unit 26 that is stored within memory unit 32. This embodiment is illustrated in FIG. 4 with a portion 104 of the contents of memory unit 32 shown as including a hardware ID along with application software and other information. In motor vehicle applications of the type illustrated in FIG. 1, it is commonplace to store the serial number of the embedded control unit 26 within memory unit 32, and in such cases this serial number is preferably used as the HWID. Alternatively, any desired identification code or other identifier unique to unit 26 may be stored within memory unit 32 and serve as the HWID for the purposes of the present invention. In any case, the service technician is preferably operable at step 56 of sub-process 50 to obtain the HWID by downloading the HWID from memory unit 32 of the embedded control unit 26 into the memory unit 14 of the service/recalibration tool 12 using known techniques.

In the embodiment of step 56 of sub-process 50 just described, the HWID obtained by the service technician corresponds to a unique identifier associated with the control unit 26. In this case, the password that will be subsequently created by the software provider to allow access to the one or more password-protected features and/or feature subsets of the engine calibration software 100, will be unique to the particular embedded control unit 26 having the unique HWID stored therein. In accordance with this embodiment of the present invention, the password thus allows the one or more password-protected features and/or feature subsets to be transferred only to the embedded control unit 26 having the corresponding unique HWID stored therein.

In an alternate embodiment of step 56 of sub-process 50, the present invention provides for the ability to download the one or more password-protected features and/or feature subsets into a predefined number of embedded control units 26. In this embodiment, the HWID is preferably a function of an identifier associated with the service/recalibration tool 12 that is stored within memory unit 14, and also a function of the number of desired downloads of the one or more password-protected features and/or feature subsets. This embodiment is illustrated in FIG. 4 with a portion 106 of the contents of memory unit 14 shown as including a service tool ID along with other information. In this embodiment, the service tool ID is preferably used as a portion of the HWID. Alternatively, any desired identification code or other identifier unique to unit tool 12 may be stored within memory unit 14 and serve as the tool identifier component of the HWID for the purposes of the present invention. In any case, the service technician is preferably operable in this embodiment of step 56 of sub-process 50 to obtain the HWID by obtaining the service tool ID or other suitable ID from memory unit 14 of the service/recalibration tool 12 using known techniques, and by combining this service tool ID or other suitable ID with the number of desired downloads of the one or more password-protected features and/or feature subsets that is preferably entered via interface unit 22 (e.g., a keyboard). The service tool ID or other suitable ID may be combined with the number of desired downloads to form the HWID using any known data combining technique such as, for example, appending the number of desired downloads to the service tool ID or other suitable ID, appending the service tool ID or other suitable ID to the number of desired downloads, and/or other more complicated techniques. Alternatively, the service technician may be operable at step 56 to provide the HWID as the unique identifier associated with the service/recalibration tool, and to provide a separate count value. In this alternative embodiment, the service technician is thus operable to obtain (and subsequently supply to the software provider) three pieces of information; namely a SWID, a HWID and a count value corresponding to the number of desired downloads of the one or more password-protected features and/or feature subsets. In either case, the password that will be subsequently created by the software provider, to allow access to the one or more password-protected features and/or feature subsets of the engine calibration software 100, will be unique to the particular service/recalibration tool 12 having the unique service tool ID or other suitable ID stored therein. In accordance with this embodiment of the present invention, the password thus allows the one or more password-protected features and/or feature subsets to be transferred only to a predefined number of embedded control units 26, corresponding to the number of desired downloads, only via the service/recalibration tool 12 having a service tool ID or other suitable ID stored therein that corresponds to the unique service tool ID or other suitable ID that forms at least part of the unique HWID.

Referring again to FIG. 2A, sub-process 50 advances from step 56 to step 58 where the service technician is operable to provide the HWID (and optionally a count value) and the one or more SWIDs to the software provider. The present invention contemplates that the service technician may execute step 58 in accordance with any of a number of known techniques, such as via communication path 20 (FIG. 1), via telephone, via mail, via FAX, via e-mail or website access, etc. In a preferred embodiment, step 58 will typically include a transfer of funds to the software provider, via any known technique, in exchange for the one or more passwords. Sub-process 50 advances from step 58 to step 60 where process control is transferred to sub-process 70 of FIG. 2B, which is preferably executed by the software provider.

Referring now to FIG. 2B, sub-process 70 begins at step 72 and at step 74 the software provider is operable to create one or more unique passwords. In embodiments wherein a single SWID is provided to the software provider, step 74 involves creating a single, unique password (PW) as a function of the HWID and SWID. In embodiments wherein multiple SWIDs are provided to the software provider, step 74 alternatively involves creating a corresponding multiple of unique passwords, wherein each password is a function of the HWID and of a different one of the multiple SWIDs. In cases where a count value is provided in addition to a HWID, step 74 involves creating the one or more passwords as a function of the HWID, the count value and the one or more SWIDs. In any case, the present invention contemplates creating the one or more passwords as any desired function of the HWID (and optionally the count value) and the various SWIDs, and in one preferred embodiment of step 74 the one or more passwords are created according to a known encryption technique such as a one-way hashing algorithm. Those skilled in the art will recognize that other functions and/or encryption techniques may be used without detracting from the scope of the present invention.

Step 74 of sub-process 70 advances to step 76 where the software provider is operable to provide the one or more passwords (PW) to the service technician or other user that executed step 58 of sub-process 50. As with step 58, the present invention contemplates that the software provider may provide the one or more passwords to the user at step 76 via any known technique, such as via communication path 20, via telephone, via FAX, via mail (e.g., either as information to be entered by the technician via a keyboard or as information stored on a storage medium such as a magnetic or compact digital disk), via e-mail or other electronic data transmission technique, etc. Sub-process 70 thereafter advances to step 78 where process control advances to sub-process 80 of FIG. 2C, which is preferably executed by the service technician.

Referring now to FIG. 2C, sub-process 80 begins at step 82 and at step 84 the service technician is operable to provide the one or more passwords (PW) to the download software 102 (FIG. 3). As part of the software transfer or downloading process in accordance with the present invention, the download software 102 is preferably configured to prompt the service technician for a password. In embodiments having only a single password (e.g., to access all password-protected features or feature subsets included with the engine calibration software 100), the download software 102 is preferably configured to prompt the service technician for the password coincident with the technician's first attempt to transfer a password-protected feature or sub-feature from the memory unit 14 of the service/recalibration tool to the memory unit of the embedded control unit 26. Alternatively, the download software 102 may be configured to prompt the service technician for the password at or near the beginning of the downloading program. In this case, a successfully entered password preferably entitles the service technician to subsequently transfer any information, including password-protected features or feature subsets from the memory unit 14 of the service/recalibration tool, to the memory unit of the embedded control unit 26. By contrast, entering an incorrect password, or failing to enter a password, preferably entitles the service technician to subsequently transfer only information that is not password-protected from the memory unit 14 of the service/recalibration tool to the memory unit of the embedded control unit 26. Those skilled in the art will recognize other techniques for configuring the download software 102 to prompt the service technician for the password, and such other techniques are intended to fall within the scope of the present invention.

In embodiments having multiple passwords (e.g., a number of different passwords for accessing correspondingly different ones of the password-protected features or feature subsets included with the engine calibration software 100), the download software 102 is preferably configured to prompt the service technician for an appropriate password coincident with the technician's first attempt to transfer a corresponding password-protected feature or sub-feature from the memory unit 14 of the service/recalibration tool to the memory unit 32 of the embedded control unit 26. In this manner, the service technician is entitled to transfer from the memory unit 14 of the service/recalibration tool to the memory unit of the embedded control unit 26 any information in the engine calibration software 100 that is not password-protected, along with any of the password-protected features or feature subsets for which the technician provides a valid password.

In any case, the technician is preferably operable at step 84 to provide one or more passwords to the download software 102 by manually entering the password information via interface unit 22 (e.g., a keyboard). Alternatively, in the case where the one or more passwords have been electronically entered into tool 12 via communication path 20 or 24, the technician is preferably operable at step 84 to provide one or more passwords by choosing appropriate ones from a menu thereof. Those skilled in the art will recognize other techniques for providing one or more passwords to the download software 102, and any such techniques are intended to fall within the scope of the present invention.

From step 84, sub-process 80 advances to step 86 where the download software 102 is operable to determine whether the password provided by the service technician at step 84 is a valid password for the information that the technician is currently attempting to transfer. The service/recalibration tool 12 has in memory unit 14 all information relating to the SWID and the HWID from steps 54 and 56, and in embodiments wherein the HWID corresponds to a single identifier associated with the embedded control unit 26, the download software 102 is preferably configured to execute step 86 by comparing information relating to the password entered at step 84 with information relating to the stored SWID and HWID values. For example, in one embodiment, the download software 102 may include an inverse function or de-encryption algorithm operable to convert the password entered at step 84 to decoded HWID and SWID values, and to then compare the decoded HWID and SWID values with the stored HWID and SWID values. Alternatively, the download software 102 may include a functional or encryption algorithm identical to that used by the software provider in creating the password at step 74 (FIG. 2B). In this case, the download software 102 is operable to determine the proper password according to the functional or encryption algorithm based on the stored HWID and SWID values, and to then compare this proper password at step 86 with the password entered by the technician at step 84. Those skilled in the art will recognize other techniques for determining the validity of the password entered by the technician at step 84, and such other techniques are intended to fall within the scope of the present invention. In any case, the download software 102 is operable at step 86 to determine that the password entered at step 84 is valid if a match, according to any of the techniques just described, is detected.

In embodiments wherein the HWID corresponds to the combination of an identifier associated with the service/recalibration tool 12 and a predefined count value, or in cases where a HWID and separate count value are provided, the download software 102 is preferably configured to execute step 86 by comparing information relating to the password entered at step 84 with information relating to the stored SWID and the portion of the stored HWID that corresponds to the identifier associated with the service/recalibration tool 12 using any of the techniques just described. Additionally, the download software 102 is preferably configured in this embodiment to maintain a counter having a counter value that is preferably preset to a default value (e.g., zero or to the count value corresponding to the desired number of downloads) by the software provider, wherein the download software 102 is further operable at step 86 to compare the counter value with the portion of the HWID that corresponds to the number of desired downloads. If the download software 102 detects a match between the information relating to the password entered at step 84 and the information relating to the stored SWID and the portion of the stored HWID that corresponds to the identifier associated with the service/recalibration tool 12, and determines that the counter value has not been decremented from its default value to or below the predefined count value, or has alternatively not been incremented from its default value to or above the predefined count value, the download software 102 is preferably operable to determine that the password entered at step 84 is valid and to modify (e.g., either increment or decrement) the counter value by one. If, on the other hand, the download software 102 detects a match between the information relating to the password entered at step 84 and the information relating to the stored SWID and the portion of the stored HWID that corresponds to the identifier associated with the service/recalibration tool 12, but determines that the counter value has previously been decremented from its default value to or below the predefined count value, or has alternatively been incremented from its default value to or above the predefined count value, the maximum number of allowable downloads has been met and the download software 102 is preferably operable to determine that the password entered at step 84 is now invalid. Similarly, if the download software 102 fails to detect a match between the information relating to the password entered at step 84 and the information relating to the stored SWID and the portion of the stored HWID that corresponds to the identifier associated with the service/recalibration tool 12, the download software 102 is preferably operable to determine that the password entered at step 84 is invalid regardless of the value of the counter.

In any case, if the download software 102 determines at step 86 that the password entered at step 84 is invalid, sub-process 80 advances to step 90 where sub-process 80 is stopped. If, on the other hand, the download software 102 determines at step 86 that the password entered at step 84 is valid, sub-process 80 advances to step 88 where the download software 102 is operable to transfer the password-protected calibration software from the memory unit 14 of the service/recalibration tool 12 into the memory unit 32 of the one or more embedded control units 26 in a manner known in the art.

Those skilled in the art will recognize that any modifications to conventional download software 102 that may be necessary to practice the present invention would be a mechanical step to a skilled artisan in view of the foregoing description.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

What is claimed is:

1. A method of authorizing transfer of software into an embedded system, comprising the steps of:
    obtaining a software identification code (SWID) relating to at least a portion of software information to be downloaded into said embedded system;
    obtaining a hardware identification code (HWID) relating to a service/recalibration tool, including accessing a memory unit of said service/recalibration tool; downloading from said memory unit an identifier associated with said service/recalibration tool, establishing a download number, said download number corresponding to a number of embedded systems authorized to receive a password protected portion of said software information, and forming said HWID as a function of said identifier and said download number,
    creating a password as a function of said HWID and said SWID; and
    downloading said password-protected portion of said software information from said service/recalibration tool into said embedded system based on said password.

2. The method of claim 1 wherein the step of downloading a password protected portion of said software information further includes:
    providing a set of software downloading instructions resident within said service/recalibration tool with said password; and
    downloading said password protected portion of said software information from said service/recalibration tool into said embedded system only if said set of software downloading instructions verifies validity of said password.

3. The method of claim 2 wherein the step of downloading a password protected portion of said software information further includes:
    providing said set of software downloading instructions with a counter having a count value initially set to a default value; and
    downloading said password protected portion of said software information from said service/recalibration tool into said embedded system and modifying said count value only if an absolute difference between said count value and said default value has not exceeded said download number.

4. A method of authorizing transfer of software into an embedded system, comprising the steps of:
    obtaining a hardware identification code (HWID) relating to a service/recalibration tool, including accessing a memory unit of said service/recalibration tool, downloading from said memory unit an identifier associated with said service/recalibration tool, and establishing said HWID as said identifier;
    obtaining a software identification code (SWID) relating to at least a portion of software information to be downloaded into said embedded system;
    establishing a download number, said download number corresponding to a number of embedded systems authorized to receive a password protected portion of said software information;
    creating a password as a function of said HWID, said SWID and said download number; and
    downloading said password-protected portion of said software information from said service/recalibration tool into said embedded system based on said password.

5. The method of claim 4 wherein the step of downloading a password protected portion of said software information further includes:
    providing a set of software downloading instructions resident within said service/recalibration tool with said password; and
    downloading said password protected portion of said software information from said service/recalibration tool into said embedded system only if said set of software downloading instructions verifies validity of said password.

6. The method of claim 5 wherein the step of downloading a password protected portion of said software information further includes:
    providing said set of software downloading instructions with a counter having a count value initially set to a default value; and
    downloading said password protected portion of said software information from said service/recalibration tool into said embedded system and modifying said count value only if an absolute difference between said count value and said default value has not exceeded said download number.

7. A method of authorizing transfer of software into an embedded system, comprising the steps of:
    providing a first identifier relating to software transferring hardware and a second identifier relating to software information to be downloaded into an embedded system to a provider of said software information, including obtaining a hardware identification code associated with a service/recalibration tool configured to download said software information into said embedded system, establishing a download number, said download number corresponding to a number of embedded systems authorized to receive said software information, and forming said first identifier as a function of said hardware identification code and said download number;
    said software provider creating a password as a function of said first and second identifiers; and
    downloading a password protected portion of said software information into said embedded system based on said password.

8. The method of claim 7 wherein the downloading step further includes:
  obtaining said password from said software provider;
  providing a set of software downloading instructions with said password; and
  downloading said password protected portion of said software information into said embedded system only if said set of software downloading instructions verifies validity of said password.

9. The method of claim 8 wherein the downloading step further includes:
  providing said set of software downloading instructions with a counter having a count value initially set to a default value; and
  downloading said password protected portion of said software information into said embedded system and modifying said count value only if an absolute difference between said count value and said default value has not exceeded said download number.

10. A method of authorizing transfer of software into an embedded system, comprising the steps of:
  providing a first identifier relating to software transferring hardware and a second identifier relating to software information to be downloaded into an embedded system to a provider of said software information, wherein said first identifier is a hardware identification code associated with a service/recalibration tool configured to download said software information into said embedded system;
  establishing a download number, said download number corresponding to a number of embedded systems authorized to receive said software information;
  said software provider creating a password as a function of said first and second identifiers and also a function of said download number; and
  downloading a password protected portion of said software information into said embedded system based on said password.

11. The method of claim 10 wherein the downloading step further includes:
  obtaining said password from said software provider;
  providing a set of software downloading instructions with said password; and
  downloading said password protected portion of said software information into said embedded system only if said set of software downloading instructions verifies validity of said password.

12. The method of claim 11 wherein the downloading step further includes:
  providing said set of software downloading instructions with a counter having a count value initially set to a default value; and
  downloading said password protected portion of said software information into said embedded system and modifying said count value only if an absolute difference between said count value and said default value has not exceeded said download number.

* * * * *